June 28, 1927.  
W. CUNLIFFE  
1,634,176  
INDICATOR  
Filed Nov. 3, 1924
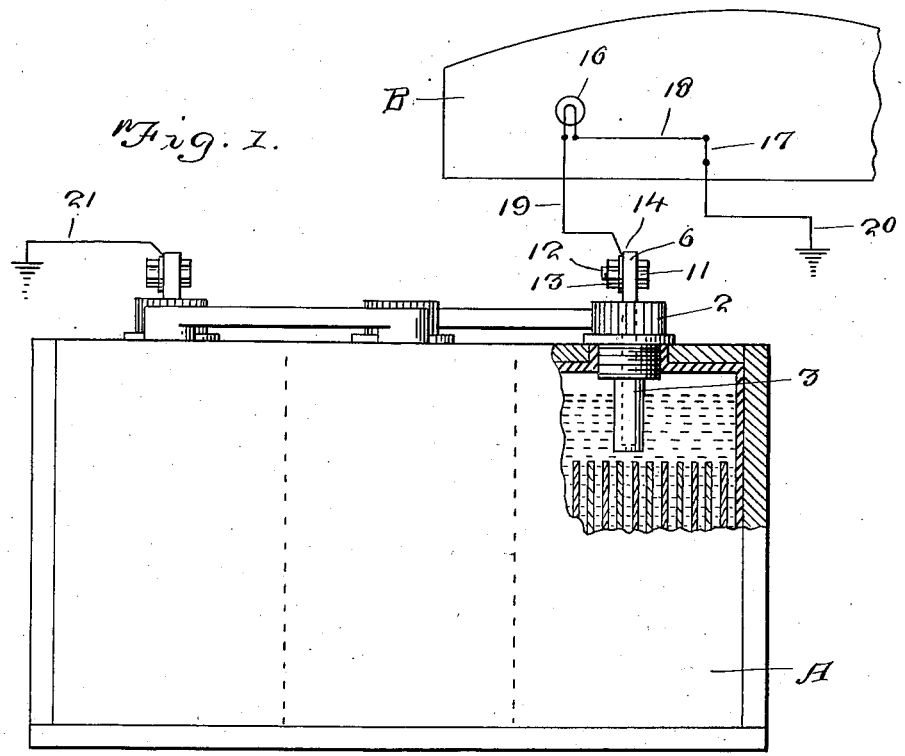
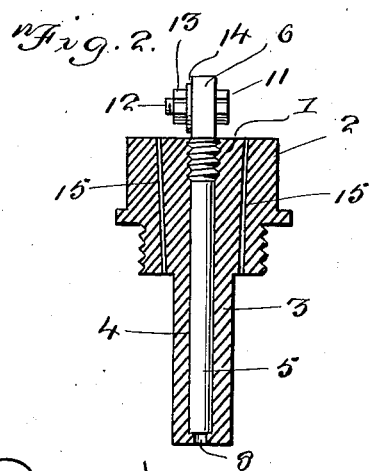 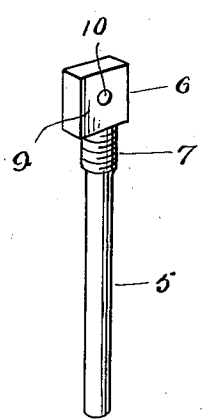
Wilfred Cunliffe  
INVENTOR  
BY Victor J. Evans  
ATTORNEY
WITNESS:

Patented June 28, 1927.

1,634,176

UNITED STATES PATENT OFFICE.

WILFRED CUNLIFFE, OF STAMFORD, CONNECTICUT.

INDICATOR.

Application filed November 3, 1924. Serial No. 747,650.

The primary object of the present invention is to provide an electrolyte indicator for storage batteries that will enable an observer to ascertain at a glance whether the height of the electrolyte in the battery is sufficient for adequate operation.

A further object of the invention is to provide an electrolyte indicator associated with the storage battery in such a manner whereby the removal of the caps of the battery is unnecessary, thereby when a battery which forms a part of the electric system of an automobile is provided with the indicator forming the subject matter of the present invention, the indicator may be positioned adjacent the driver's seat of the automobile, whereby it may be ascertained without moving from the driver's seat if sufficient electrolyte is in the battery.

This invention also consists in certain other features of construction and in the combination and arrangement of the several parts, to be hereinafter fully described illustrated in the accompanying drawings and specifically pointed out in the appended claim.

In describing my invention in detail, reference will be had to the accompanying drawings wherein like characters denote like or corresponding parts throughout the several views, and in which:

Figure 1 is a side view of the battery partly in section and illustrating the application of the invention, together with a diagramatic view of its connection with an automobile.

Figure 2 is a vertical sectional view through a portion of the invention which is directly associated with the battery.

Figure 3 is a detail view of a portion of the structure shown in Figure 2.

Referring to the drawings in detail the letter A indicates a battery of the usual construction, and B an instrument board of an automobile.

One of the filling openings of the battery which is adapted to fill one cell thereof, threadedly receives a modified cap 1 which forms the main portion of the present invention. The cap 1 includes a body portion 2 with an elongated portion 3 depending therefrom. The body portion 2 together with the depending portion has centrally formed therethrough a bore 4 for receiving a lead rod 5 having a head 6 formed on its upper end and provided with threads 7 adjacent the head to be accommodated in screw threads formed in the upper end of the bore 4, as clearly shown in Figure 2 of the drawings. The lower end of the lead rod terminates adjacent the lower end of the bore in the depending portion to provide a recess 8 which is adapted to receive electrolyte therein from the cell of the battery. The head 6 is provided with flat sides 9 and centrally formed in the head is an opening 10 to receive a headed brass bolt 11 having a threaded end 12 to which is secured a nut 13 positioned from the head by a washer 14.

The body portion 2 of the cap has formed therethrough, converging vent openings 15.

The lower end of the depending portion together with the lead is adapted to extend into one cell of the battery and within the electrolyte therein for a predetermined distance preferably to a point adjacent the top of the plates of the battery whereby should the electrolyte fall below the end of the lead the plates will still be covered.

Arranged upon the instrument board B of the automobile (not shown) is a lamp 16 and a switch 17 which are operatively associated through the medium of a conductor wire 18. The lamp is also connected to the bolt of the head through the medium of a conductor wire 19. While a conductor wire 20 connects the opposite end of the switch 17 with the ground, as clearly shown in Figure 1 of the drawings. A conductor wire 21 completes the circuit from the ground to the battery and has its battery end secured to the negative terminal thereof, thereby completing an electric circuit to the lamp providing the electrolyte in the battery is of sufficient height to be received in the recess 8 above referred to.

From the above description and the drawings which form a portion of this application it will be seen that when the switch 16 is on, the lamp 15 will light if the electrolyte within the battery is of sufficient height and if the electrolyte is below the recess 8, the lamp will not light thereby indicating that the battery is in need of liquid.

I is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

In an indicator, an electrode therefor comprising a cap provided with converging vent openings arranged therethrough and being formed with threads on a portion of its exterior surface, a depending elongated portion formed integral with the cap and together therewith being formed with a single longitudinal bore, a lead rod passing through the bore of the cap and received in the bore of the depending portion respectively, and said rod terminating adjacent the lower end of the bore of the elongated portion to provide a recess in said depending portion, said rod being threadedly secured in said cap and an aperture flat head formed on the upper end of said rod.

In testimony whereof I affix my signature.

WILFRED CUNLIFFE.